United States Patent
Alonso Cebrian et al.

(10) Patent No.: US 11,317,277 B2
(45) Date of Patent: Apr. 26, 2022

(54) METHOD, DEVICE AND SYSTEM FOR SECURE CONNECTION IN WIRELESS COMMUNICATIONS NETWORKS

(71) Applicant: Telefonica Cybersecurity & Cloud Tech S.L.U., Madrid (ES)

(72) Inventors: José María Alonso Cebrian, Madrid (ES); Aruna Prem Bianzino, Madrid (ES); Pablo González Pérez, Madrid (ES); Sergio De Los Santos Vilchez, Madrid (ES)

(73) Assignee: Telefonica Cybersecurity & Cloud Tech S.L.U., Madrid (ES)

( * ) Notice: Subject to any disclaimer, the term of this patent is extended or adjusted under 35 U.S.C. 154(b) by 189 days.

(21) Appl. No.: 16/884,149

(22) Filed: May 27, 2020

(65) Prior Publication Data
US 2020/0382952 A1    Dec. 3, 2020

(30) Foreign Application Priority Data

May 29, 2019 (EP) .................................. 19382429

(51) Int. Cl.
*H04W 4/00* (2018.01)
*H04W 12/00* (2021.01)
*H04W 76/10* (2018.01)
*H04W 84/12* (2009.01)

(52) U.S. Cl.
CPC ......... *H04W 12/009* (2019.01); *H04W 76/10* (2018.02); *H04W 84/12* (2013.01)

(58) Field of Classification Search
CPC ..... H04W 72/02; H04W 72/04; H04W 12/08; H04W 12/06
See application file for complete search history.

(56) References Cited

U.S. PATENT DOCUMENTS

| 7,492,745 B2* | 2/2009 | Lee ........................ | H04W 48/16 370/338 |
| 2006/0209773 A1* | 9/2006 | Hundal ................. | H04W 12/35 370/338 |
| 2011/0158409 A1* | 6/2011 | Sugawara ............. | H04W 12/08 380/270 |
| 2015/0223068 A1* | 8/2015 | Thelen ................ | H04W 12/069 726/7 |

(Continued)

FOREIGN PATENT DOCUMENTS

| WO | WO 2009/120898 | 10/2009 |
| WO | WO 2019/101839 | 5/2019 |

OTHER PUBLICATIONS

European Search Report dated Oct. 17, 2019 From the European Patent Office Re. Application No. 19382429. (2 Pages).

*Primary Examiner* — Shantell L Heiber

(57) ABSTRACT

The present invention proposes a method, device and system for protecting the connection to a wireless network (a WiFi network) by users of electronic communications devices, even the first time the user device connects to the network. The proposed method, device and system provides an improved security when connecting to a WiFi network, avoiding attacks that may jeopardize the security, confidentiality, integrity and availability of WiFi users and WiFi infrastructure. In the proposed solution, the network will be certified by the user device before connecting to an access point for accessing the wireless network.

15 Claims, 3 Drawing Sheets

(56) References Cited

U.S. PATENT DOCUMENTS

2017/0013549 A1\* 1/2017 Ou ........................ H04W 12/08
2017/0208631 A1   7/2017 Freudiger et al.
2017/0265069 A1\* 9/2017 Palanigounder ...... H04L 9/0643
2018/0332471 A1\* 11/2018 Zhu ..................... H04W 12/041

\* cited by examiner

METHOD, DEVICE AND SYSTEM FOR SECURE CONNECTION IN WIRELESS COMMUNICATIONS NETWORKS

RELATED APPLICATION

This application claims the benefit of priority of European Patent Application No. 19382429.9 filed on May 29, 2019, the contents of which are incorporated herein by reference in their entirety.

FIELD AND BACKGROUND OF THE INVENTION

The present invention applies to the telecommunications sector and relates particularly to access to a wireless communications network by means of electronic equipment. The invention described in the present specification relates to secure connection of a wireless electronic device, usually a mobile electronic device (also called mobile terminal or mobile device), to a wireless communications network and more specifically, to WiFi networks.

Mobile devices (mobile phones, tablets, laptops, etc.) are proliferating, the majority of which account mainly on their WiFi interface for network connectivity. These devices are used for a wide range of scopes, including business, and from a wide range of locations, including public areas and accessing public networks.

As it is well known, WiFi (also called Wi-Fi) networks are wireless networks implementing any of the IEEE 802.11 standards. Said networks are used to provide wireless connections to electronic devices to connect to the Internet (or communicate with one another wirelessly within a particular area).

The current security mechanisms offered by WiFi networks include client authentication, communication encryption, non-disclosed SSID (Service Set Identifier) and client filtering by hardware address (i.e., MAC Address). The Service Set Identifier is the name assigned to a WiFi network. When a wireless network is set up, a name (SSID) is assigned it to distinguish it from other networks in its neighborhood; this name is the one seen when any device is attempting to connect to a wireless network.

This security model has been proved to be insecure and its strength dependent on the chosen password and the system is still susceptible to attackers capturing the key exchange. Furthermore, a wide range of network configurations is used, including open networks (i.e., networks with no authentication nor encryption mechanisms), depending on the scope of the network and the required degree of device compatibility. For instance, open networks are used in public spaces and/or commercial buildings to offer connectivity to citizens and customers. Furthermore, some mobile devices are set by the producer to automatically connect to any WiFi network with a specific SSID (e.g., "attwifi" for AT&T iPhones), leaving the user unaware of the connection and opening the opportunity for simple attacks based SSID cloning.

This scenario paves the way to different attacks exploiting user automatic connection to open or memorized networks—like the evil twin wireless access point attack—that may jeopardize the security, confidentiality, integrity and availability of WiFi users and infrastructure.

There are some existing solutions which improve the security of WiFi networks access. However, all of them present serious drawbacks, as for example:

Open side channels may be used for communication between the access point and the connecting device, in order to exchange some kind of authentication information before the user decides whether to connect to the access point or not. For instance, the iBeacon technology could be used from the access point to share a public certificate with the connecting user. This will imply complex requirements as: (i) the compatibility with the side channel technology (e.g., iBeacon) on both sides (i.e., Access Point and connecting user), and (ii) an alternative connectivity for the connecting user in order to verify the received authentication information (e.g., public certificate). These requirements are not needed by the solution presented in this specification.

Despite the risk of connecting to WiFi network being widely recognized, advised countermeasures usually leverage on (i) not connecting to any network, (ii) asking other users about the target network security, (iii) minimize the network usage, or (iv) VPN usage. While the VPN usage is compatible with the proposed approach, its availability depends on the used mobile device and may considerably reduce the connectivity speed. On the other hand, all other advised practices may not be available, they are hard to automatize and they require the active participation of the user.

The patent application US 2017/0208631 discloses methods to allow a mobile device to determine the presence or absence of internet connectivity of a wireless network before connecting to it. This operation is performed by sending a packet to a server in the internet, or to a DNS, which may be encrypted using the private key of the user connecting to the network. This solution allows the user to identify some characteristics of a wireless network before connecting to it, in order to decide whether to connect to it or not, but this set is limited to the network direct internet connectivity, in order to avoid eventual captive portals or pay-per-use networks, while do not provide any instrument against eventual fraudulent access points.

There is therefore the need to provide an effective security mechanism to access WiFi networks which completely covers the current needs of security of the users and of the network, not having the limitations and vulnerabilities of the security mechanisms existing today.

SUMMARY OF THE INVENTION

The present invention provides a mechanism for securing the access to a wireless network (a WiFi network) by users of electronic communications devices which avoids attacks that may jeopardize the security, confidentiality, integrity and availability of WiFi users and WiFi infrastructure and which does not have the drawbacks of existing security mechanisms. In the proposed solution the wireless users certify the WiFi network (the WiFi access point) before connecting to it; in an optional embodiment, in order to improve the network security, the network infrastructure may allow only connections from users certifying the Access Point. This improved mechanism proposed by the present invention is referred to as SSID Fastening.

The proposed solution implies several advantages, as for example:

Decision support to users when connecting to a WiFi network (even the first time connecting to a new network) on the basis of both system learning and user input.

Automatic connection decision for known (not new for the user) WiFi networks.

Automatic connection rejection for known but mismatching WiFi networks.

Customizable set of checked parameters, and corresponding thresholds and values, to identify and evaluate WiFi Networks.

Support for Access Points to enforce network check among connecting users.

Minimum level of required Hardware and Software compatibility.

Automatable process with minimal, but customizable, level of user intervention and information.

Protection against evil twin access point and other frequent network attacks.

A unique focus on the security level of the network, instead of only the user's one.

According to a first aspect, the present invention proposes a method for improving the security of the connection of a user device (a user wireless device) to WiFi networks, where the method comprises the following steps:

a) receiving, by the user device a beacon signal from an access point belonging to a WiFi network;

b) after receiving the beacon signal, if the user device has been never connected to said WiFi network going to step c), otherwise going to step e)

c) the user device providing decision support information to the user through an user interface of the user device and, after providing said decision support information, if the user device receives from the user through the user interface a validation of the WiFi network (in other words a validation of the access to the network through said access point), going to step d), otherwise the method ends;

d) the user device sending a connection request to the access point and the user device providing to the user through the user interface the following list of parameters: (estimated) position of the access point, set of neighbor networks to the WiFi network detected by the user device, signal strength of neighbor networks, identifier of the access point and user devices connected to the WiFI network, and the user device receiving from the user through the user interface, a selection of some or all of them as verification parameters to be verified for future connection attempts to the WiFi network and the method ends;

e) the user device obtaining the current value of the verification parameters selected the first time the user device was connected to the network (from the group including position of the access point, set of neighbor networks to the WiFi network detected by the user device, signal strength of neighbor networks, identifier of the access point and user devices connected to the WiFI network), comparing the current value of the verification parameters selected with a pre-established (usual) value of the verification parameters, determining whether the network verification (verification of the access to the network through the detected access point) is positive or negative based at least on said comparison and, only if the network verification is positive the user device sending a connection request to the access point.

In an embodiment, in step c) the user device obtains (measures) the current value of some or all of the following parameters: position of the access point, set of neighbor networks detected, signal strength of neighbor networks detected, access point identifier and user devices connected to the WiFI network; and the decision support information comprises one or more of the following: the obtained current value of the obtained parameters, eventual similar networks on the basis of the obtained current value of the obtained parameters together with the corresponding validation status (whether they have been validated by the user or not) of said similar networks, a list of allowed WiFi networks and/or of allowed access points (whitelist), a blacklist of WiFi networks and/or of access points (list of forbidden or not recommended networks), the corresponding value of the verification parameters in the networks of the blacklist or of the whitelist . . . .

In an embodiment, determination in step e) is also made based on the list of allowed WiFi networks (and/or a list of allowed access points) and/or a blacklist of WiFi networks (and/or a list of forbidden access points).

If the user device does not validate the network in step c), the obtained current value of the parameters may be stored in a database (common for all or some of the users); the WiFi network (and/or the access point) may be added to a blacklist. Also, the current value of the verification parameters obtained in step e) may be stored in the database.

In an embodiment, the method further comprises the following steps performed by the user device:

f) when the user device sends a connection request to the access point:

f1) receiving a message from the access point asking for a digest of the value of the verification parameters obtained by the user device, f2) sending the digest of the value of the verification parameters obtained by the user device and f3) receiving from the access point an IP address only after a WiFi network node (the access point or other network node), based on said digest, determines that the connection is allowed.

In an embodiment, the method further comprises the following steps performed by the access point:

g) if it is received a connection request from the user device;

g1) sending a message to the user device asking for a digest of the value of the verification parameters obtained by the user device, g2) receiving the digest of the value of the verification parameters obtained by the user device and g3) determining whether an IP address is assigned to the user device or not, based at least on said digest.

The pre-established value of the verification parameters may be calculated based on the value of the verification parameters (e.g. as an average) in all or some of the previous times the user device has been connected to said network.

Step d) may further comprise that the user, through the user interface of the user device, selects thresholds and/or the pre-established value of each verification parameters, to be used in the comparison of step e) for each verification parameter. Step d) may also further comprise that the validated WiFi network (and/or the access point) is added to a whitelist (a list of allowed WiFi networks or access points).

The identifier of the access point may be the MAC address of the access point wireless interface or the Basic Service Set Identifier, BSSID, of the WiFi network to which the access point belongs to.

The user device may be a tablet, a mobile telephone, a smartphone, a laptop, a computer, a PC . . . (and generally any electronic equipment or device that can be connected to a wireless communications network).

According to a second aspect, the present invention proposes a user device for improving the security of the connection of the user device to WiFi networks, where the user device comprises:

a receiver for receiving a beacon signal from an access point belonging to a WiFi network;

a processor configured to:

after receiving the beacon signal, if the user device has never been connected to said WiFi network: provide decision support information to the user through an user interface of the user device; and, after providing said decision support information, if the user device receives from the user through the user interface a validation of the access to the WiFi network (through the detected access point), send a connection request to the access point, provide to the user through the user interface the following list of parameters: GPS position of the user device, set of neighbor networks to the WiFi network detected by the user device, signal strength of neighbor networks, identifier of the access point and user devices connected to the WiFI network, and receive from the user through the user interface, a selection of some or all of them as verification parameters to be verified for future connection attempts to the WiFi network;

after receiving the beacon signal, if the user device has ever been connected to said WiFi network: obtain the current value of the verification parameters selected the first time the user device was connected to the network, compare the current value of the verification parameters selected with a pre-established usual value of the verification parameters, determine whether the network verification (the access to the network through the detected access point) is positive or negative based at least on said comparison and, only if the network verification is positive the user device send a connection request to the access point.

According to a third aspect, the present invention proposes a system for improving the security of the connection of a user device to WiFi networks, comprising the user device disclosed above and an access point belonging to a WiFi network, where the access point is configured to send a beacon signal to the user device. The access point may also comprise:

a receiver configured to receive a connection request from the user device.

a processor configured to, if it is received a connection request from the user device, perform the following actions:

send a message to the user device asking for a digest of the value of the verification parameters obtained by the user device, receive through the receiver the digest of the value of the verification parameters obtained by the user device;

determine whether an IP address is assigned to the user device or not, based at least on said digest;

send the IP address to the user device if it is determined that an IP address is assigned to the user device.

In a last aspect of the present invention, a computer program is disclosed, comprising computer program code means adapted to perform the steps of the described methods, when said program is run on processing means of a network entity of an OFDMA network, said processing means being for example a computer, a digital signal processor, a field-programmable gate array (FPGA), an application-specific integrated circuit (ASIC), a micro-processor, a micro-controller, or any other form of programmable hardware. In other words, a computer program is provided, comprising instructions causing a computer executing the program to perform all steps of the described method when the program is run on a computer. A digital data storage medium is also provided for storing a computer program comprising instructions, causing a computer executing the program to perform all steps of the disclosed methods when the program is run on a computer.

Additional, specific and preferred aspects, embodiments and details of the invention are stated in the attached independent and dependent claims. For a more complete understanding of the invention, its objects and advantages, reference can be made to the following specification and to the attached drawings.

BRIEF DESCRIPTION OF THE SEVERAL VIEWS OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character.

DESCRIPTION OF SPECIFIC EMBODIMENTS OF THE INVENTION

Figure 1:
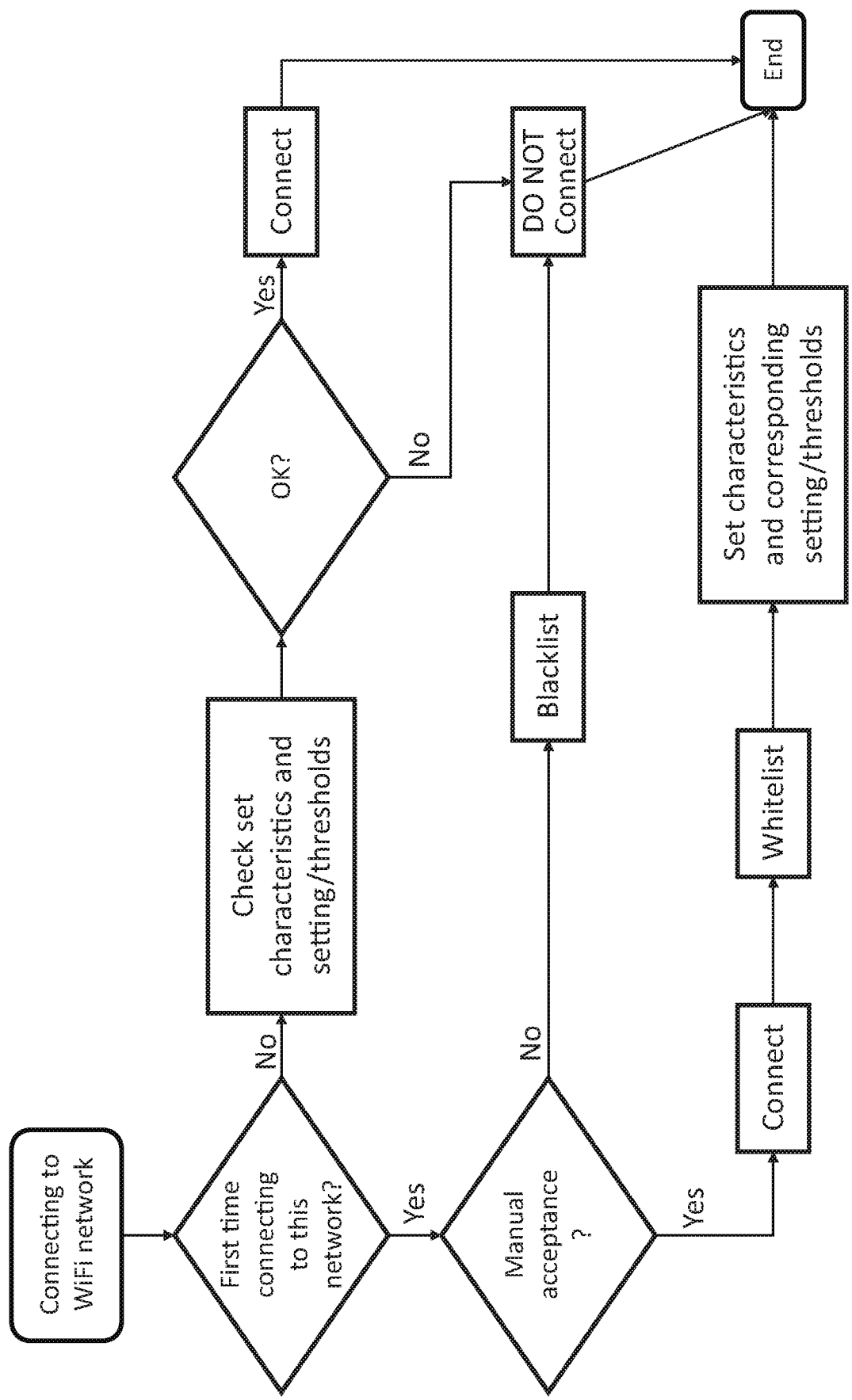
FIG. 1 shows a flow chart of the proposed security mechanism according to one embodiment of the present invention.

The present invention proposes an improved protection mechanism or methodology for protecting users of wireless electronic communications devices when connecting to a wireless telecommunications network and, more specifically, when accessing WiFi networks. That is, the present invention provides a secure connection to wireless telecommunications networks for users of electronic communications devices. In the proposed solution the network, via the network access point (wireless network element the user's electronic communications device connect directly with, to access to the wireless network), will be certified by the user before connecting to the access point for accessing the wireless network.

The user wireless electronic communications device (or more simple, user device or user wireless device) can be a computer, a PC or a mobile device such as a tablet, a mobile telephone, a smartphone, a laptop . . . and generally any electronic equipment or device that can be connected to a wireless communications network.

According to the proposed solution, in order to certify the access point, a user may verify different characteristics of the access point (called validation or verification parameters), including any combination of the following, depending on the user setting and on the user's device features (e.g., GPS availability):

Position (of the access point) within a specified area. The position of the access point may be transmitted by the access point or estimated based on the position of the user device (for example the GPS position) when detecting the access point. This avoids connecting to a clone access point located in a position different than usual. The user may set a threshold for maximum distance from the usual connection point. For example, if when detecting the signal from a usual access point, the device location is not within a distance of the usual location where said network is used (where the access point has been detected in previous connections) the access point is not certified.

Set of neighbor networks. The neighbor networks may be defined as the wireless (wifi) networks detected at the same time than the network whose access point the device wants to certify. The user may check the current list of neighbor networks and set a minimum intersection (coincidence) with the usual list of neighbor network. That is, for the WiFi network (to which the user device is attempting to connect) it is set a list of usual neighbor networks detected when the user connects to said network and if the amount of common (coincident) networks between the current list of neighbor networks and the usual list of neighbor network is less than a previously set threshold, the verification is determined to be negative (also for example, if a certain neighbor network or a certain group of neighbor networks usually detected does not appear in the current list of neighbor networks, the verification is determined to be negative). Also an eventual whitelist (list of allowed networks) and/or blacklist (list of forbidden or not recommended networks) of neighbor networks is checked. Of course, when a networks blacklist exists, not only the neighbor networks but also the target network (the network whose access point is to be certified) is also checked in this networks blacklist (that is, if the target network is included in the networks blacklist, the verification will be negative and the network shall not be certified.

Footprint of neighbor networks. Among the all the detected neighbor networks of for the intersecting neighbor networks identified in the previous option, the user may check if their signal strength corresponds (within properly set thresholds) to the usual signal strength received from the same networks as previously registered. That is, for the WiFi network (to which the user device is attempting to connect) it is set a list of usual neighbor networks detected when the user connects to said network and it is registered the usual signal strength received from each neighbor network in previous connections attempts to the WiFi network (for example, an average of the signal strength received in all of some of the last connection); then if the current signal strength received from said neighbor networks (or from a sub-group of them) is not within a threshold value from the usual signal strength received from each neighbor network the verification is determined to be negative. A minimum number of corresponding signal levels may be set by the user, as well as corresponding level thresholds.

Access point unique identifier. The user may check a unique identifier of the network access point compared to other access points of different networks, e.g., the Media Access Control (MAC) address of the wireless interface of the access point, or its BSSID (Basic Service Set Identifier), against the registered one for the network of the checked access point. The Basic Service Set Identifier is a unique identifier that is associated to a wireless network and usually corresponds to the MAC (Media Access Control) address of the egress router of the network. In a standard configuration, the same BSSID is configured in all the Access Points of the same wireless network. In the case of multiple access points belonging to the same network, there will be a common BSSID for all the access points; however the MAC address of the specific access point would still allow to discriminate the specific access point, being it unique to the network interface.

Set of connected user devices. The user may check for the presence of a specific set of users devices connected to the same network, by a unique identifier of the devices, e.g., the MAC address of their wireless interface. The user may keep a list of usual user devices connected to the WiFi network he wants to certify and set a specific threshold of minimum common users devices between the current connected ones and the usual ones in order to certify the access point. As an alternative, specific known users devices may be checked for presence (or absence) in the network as they may represent, for instance, fix devices connected to the network, like printers or IP cameras, again by a unique identifier of the devices, e.g., the MAC address of their wireless interface. In order to obtain the set of already connected user devices, many procedures can be used; for example, the user device may request to the access point (before connecting to the network) the list of already connected user devices, the user device may intercept (sniff) the access point communications to detect the connected user devices (even though this procedure will take longer and is more complicated) or any other known procedure.

Hence, the above stated criteria for certifying an access point are based on comparing current information with usual (or generally speaking, previous) network information, so it is clear that the above stated criteria cannot be verified the first time a user connects to a wireless network. For this reason, the proposed procedure will differentiate the case when the user connects for the first time to a network from the case when it is not the first time the user connects for the network.

Generally speaking, there are two main different scenarios: i) when a new network is detected (and consequently a new access point is detected) and ii) when a known network is detected. In the latter scenario, two sub-scenarios could be also differentiated: ii1) a new access point of a known network is detected and ii2) a known access point of a known network is detected. For these scenarios, a group of parameters to be checked (which could be different for each scenario or not) could be set and a group of threshold/value/set of values/blacklist/whitelist. could be set for each verification parameter. In the case ii1) the fact that the access point belongs to the same network of another access point which has been accepted (certified) is a favourable factor which could be taken into account for the certification (together with all the other verification parameters).

The steps of the procedure or algorithm ("network fastening algorithm") proposed by a preferred embodiment of the present invention in order to provide a secure connection to a WiFi network will be now explained (a flow chart of the algorithm is shown in FIG. 1):

When a user is attempting to connect to a wireless network (that is, when the user device detects a beacon signal from an access point belonging to a network the user wants to connect to) network parameters (verification parameters) according to the criteria used to verify the access point previously presented are measured (if they are available) That is the current value of the verification parameters is obtained. Said parameters may include the position, the set of neighbor wireless networks detected, the signal strength of the neighbor wireless networks, the unique identifier of the access point and the set of users connected to the network. In an embodiment, only the parameters previously selected by the user for verification (verification parameter) are measured/obtained (if no parameters have been be previously selected by the user, a default set of verification parameters may be used). In an embodiment, the user may select an specific set of verification parameters for new networks (that is, the user selects a different set of verification parameters to be measured for new networks than for already connected networks). In the case of new networks, in an embodiment, the user may also select the thresholds, blacklist, whitelist . . . , to be used to compare each verification parameter, in order to decide, whether the access point is certified or not.

If the user device is attempting to connect to a new network (that is, the user device has not been previously connected to said network), the user is asked (e.g. through an user interface of the user device) for manual validation of the network. A list of decision support parameters may be offered to the user, including current values of some or all the possible verification parameters, eventual similar networks on the basis of the measured parameters (position, neighbor networks and corresponding signal strength, and/or connected users), together with the corresponding validation status of similar networks, in order to support the manual validation. Other parameters may be offered to the user as decision support, including for example the number of connected users.

If the user validates the network, the user device is connected to the network (that is, the connection establishment procedure starts). Before or after the connection, the user is asked to select (e.g. through an user interface of the user device) the parameters to check for next connection attempts (position, neighbor networks, footprint of neighbor networks, access point identifier or set of connected users), and the corresponding measured parameters and the thresholds for future checkings (e.g., allowed distance for the position). Usually, the network is also added to the user whitelist.

If the user does not validate the network, the user device is not connected to the network and the network may be added to the blacklist. The corresponding parameters may be registered to be used in the decision support step. That is, in the case, that the network is not validated by the user, the measured values corresponding to that specific network may be stored and in the future, if a network presents a similar set of parameters to this rejected one, the information may be forwarded to the user as decision support (i.e., as a warning in this case).

If the user is attempting to connect to a known network (that is, the user has been previously connected to said network), the usual value of the set of validation parameters (position, neighbor networks, footprint of neighbor networks, access point identifier and/or set of connected users) selected by the user during the first connection to the same network is checked against the current measured values for said selected validation parameters and using the thresholds previously set by the user, if any. This usual value of the set of validation parameters may be establish using any known technique, for example an average of the value of the parameters in all the times the user device has been connected to said network, the value of the parameters the last time the user device has been connected to said network, the average in the last two, three, four times etc.

If the parameters match, the user device is connected to the network (the connection establishment procedure starts);

Otherwise the user device is not connected to the network and the user may be notified of the connection failure, depending on a proper setting.

A common data base (for example in a remote server) may be used to support the user decision on the first connection, including known fraudulent networks and the corresponding parameters (said information will be obtained by the user device from the common database), but some parameters are metering dependent and their measurement may vary from device to device (e.g., network signal strength). As such, these parameters may only be used as general indicators, while other parameters, independent on the metering, may be used on a more reliable base (e.g., GPS location). For the same reason, a sharing of whitelist and blacklist among devices, including the corresponding parameter values and threshold setting is possible but not advisable, as the metering sensitive parameters may induce to false positives/negatives in the network validation process.

Figure 2:
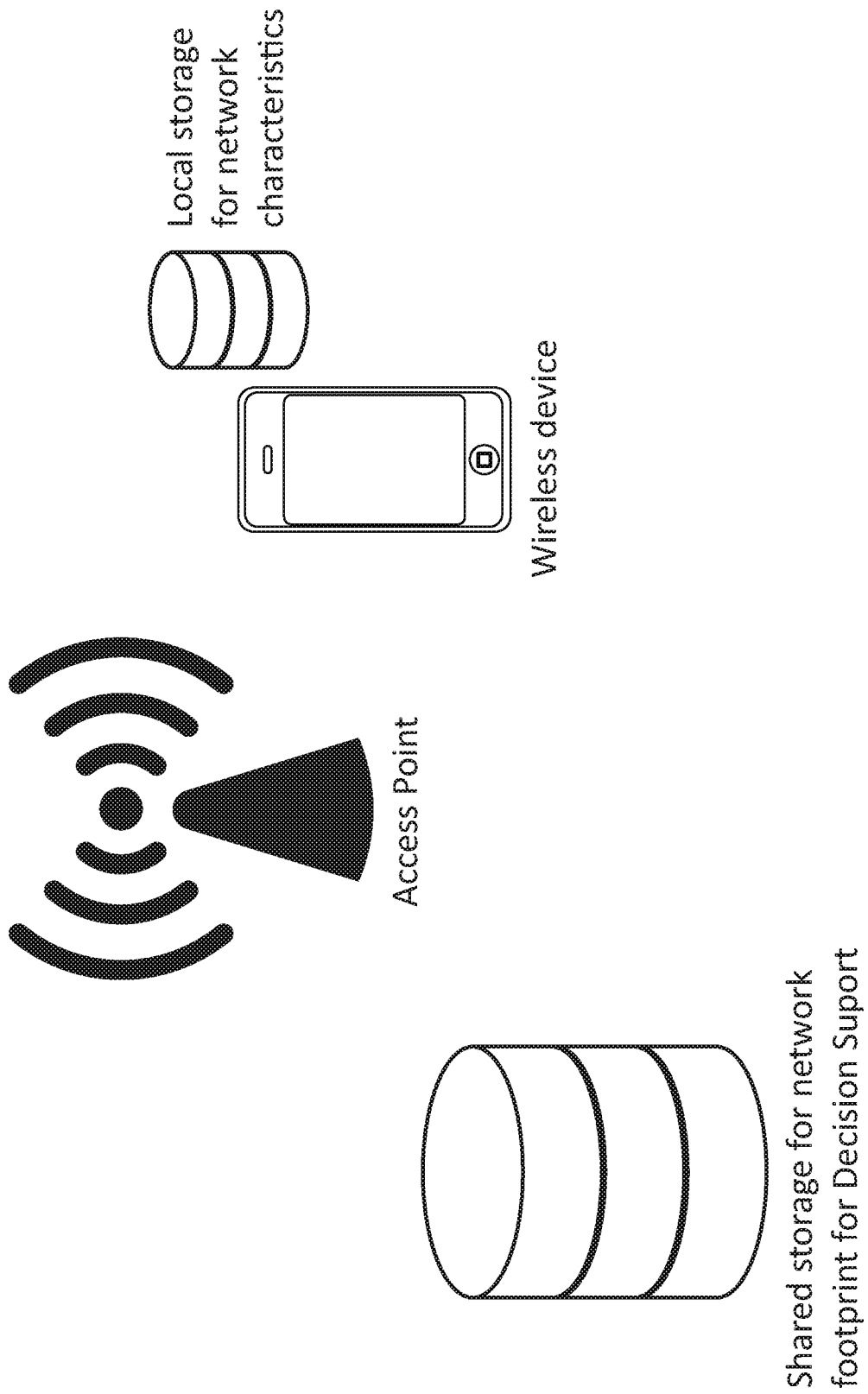
FIG. 2 schematically shows a block diagram of a possible implementation of the system providing the proposed security mechanism according to one embodiment of the present invention.

In other words, in an embodiment, the parameters to support the user decision on the first connection (e.g. networks footprint parameters for decision support) are stored in a storage shared by all the users or a group of users (that is, a common database accessible by all the users or a group of users). The network characteristics measured by the user device each time it is connected to a WiFi network may be stored in a local storage accessible by the user device (said local storage may be the user device itself). FIG. 2 depicts the architecture of a possible implementation of the proposed security mechanism according to one embodiment of the present invention.

In an embodiment, in order to improve the security, the network infrastructure may allow only connections from users certifying the access point. In other words, in an embodiment, the described solution may be exploited also by the access point itself, as it may, for instance, only accept users which execute the above described protocol before connecting, considering at least a specified subset of the described parameter. This may be implemented, for instance, imposing the connecting user device to send to the DHCP (Dynamic Host Configuration Protocol) module a digest of the registered values for the considered parameters, as a condition for being assigned an IP address, as it will be explained now.

Figure 3:
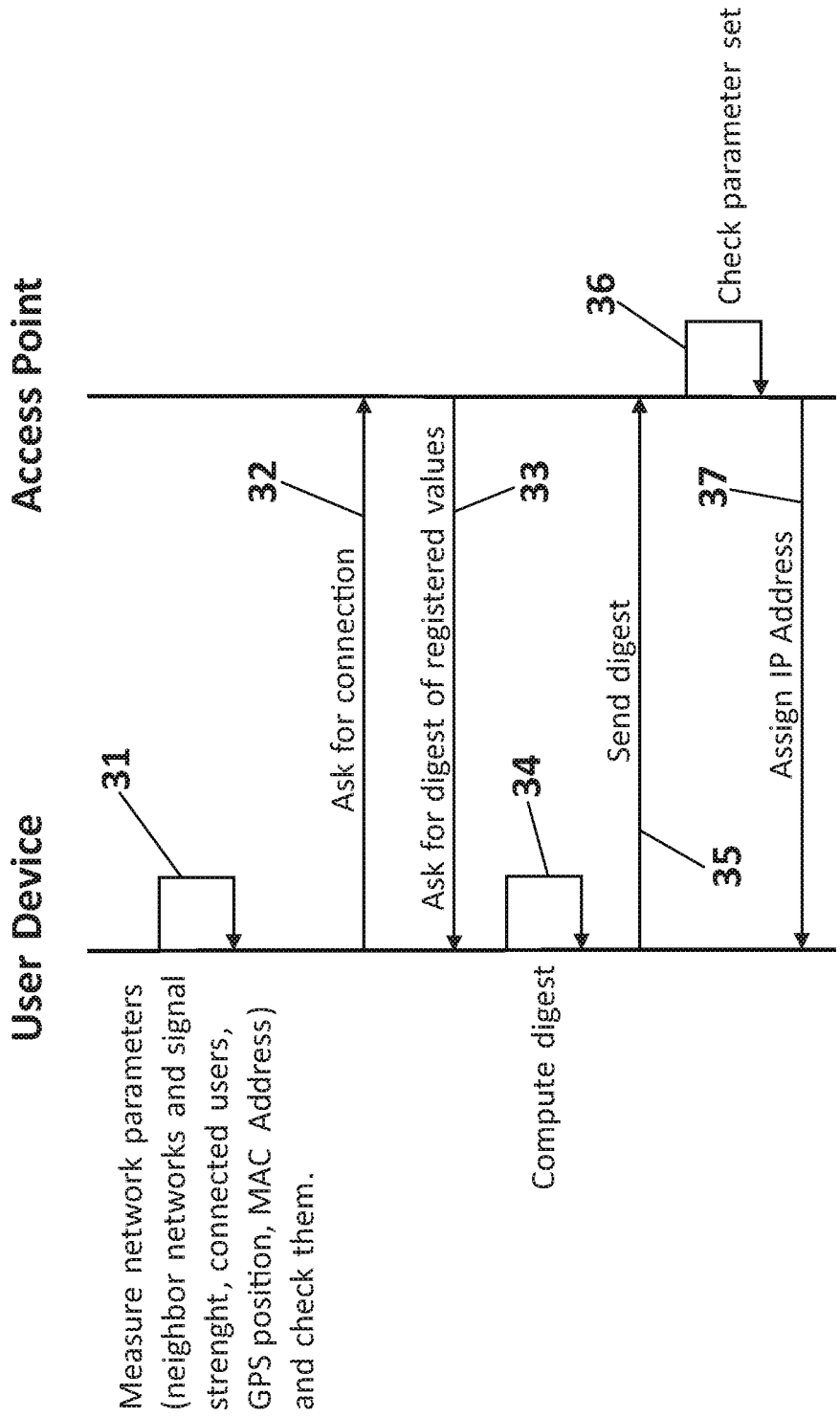
FIG. 3 schematically shows a diagram of the sequences of messages for Access Point security increase, according to one embodiment of the present invention.

FIG. 3 shows a sequence diagram of a possible implementation of this embodiment (extension of the security mechanism to the access point) for a successful connection case. In FIG. 3 it is supposed that the previously disclosed security mechanism (FIG. 1) has been applied and it has been successful (31). That is validation network parameters according to the criteria selected to verify the access point, have been measured (GPS position, the set of neighbor wireless networks detected, the signal strength of the neighbor wireless networks, the unique identifier of the access point and/or the set of users connected to the network), the usual value of the set of the selected validation parameters is checked against the current measured values and the parameters match. Then the user device asks for connection to the network to the access point (32).

Then the access point asks (33) the user device to send the selected registered validation parameters values (a digest of them) as for example GPS position, the set of neighbor wireless networks detected, the signal strength of the neighbor wireless networks, the unique identifier of the access point and/or the set of users connected to the network. This requested digest of parameter values is computed (34) by the user device and sent (35) to the access point.

Then the parameters set (and more specifically, the digest) is checked (36) by the access point itself or by the DHCP node (for example, a router). And if this check is correct, an IP address is assigned and sent (37) to the user device (so the user device can communicate with the network).

Note that in this text, relational terms such as first and second, greater and lower and the like, can only be used to distinguish one entity or one action from another, without actually necessarily requiring or implying that relation or order between said entities or actions. Furthermore, the term "comprises" and the derivations thereof (such as "comprising", etc.) must not be understood in an exclusive sense, i.e., these terms must not be interpreted as excluding the possibility that what is described and defined may include additional elements, steps, etc.

Having sufficiently described the nature of the invention as well as the manner of carrying it out in practice, the possibility that the different parts thereof could be manufactured from a variety of materials, in a variety of sizes and shapes must be highlighted, those variations recommended by the practice also being able to be introduced in its constitution or method provided that they do not alter the fundamental principle of the present invention. The description and drawings only illustrate the principles of the invention. Therefore, it must be noted that the persons skilled in the art could conceive several arrangements which, although have not been explicitly described or shown in this document, represent the principles of the invention and are included within its scope. Furthermore, all the examples described must be considered as non-limiting with respect to such specifically described examples and conditions. Furthermore, all that is described in this document relating to the principles, aspects and embodiments of the invention, as well as the specific examples thereof, cover the equivalences thereof.

What is claimed is:

1. A method for improving the security of a connection of a user device to WiFi networks, where the method comprises the following steps:
    a) receiving, by the user device a beacon signal from an access point belonging to a WiFi network;
    b) after receiving the beacon signal, if the user device has been never connected to said WiFi network going to step c), otherwise going to step e)
    c) the user device providing decision support information to the user through an user interface of the user device and, after providing said decision support information, if the user device receives from the user through the user interface a validation of the WiFi network, going to step d), otherwise the method ends;
    d) the user device sending a connection request to the access point and the user device providing to the user through the user interface the following list of parameters: position of the access point, set of neighbor networks to the WiFi network detected by the user device, signal strength of neighbor networks, identifier of the access point and user devices connected to the WiFi network, and the user device receiving from the user through the user interface, a selection of some or all of them as verification parameters to be verified for future connection attempts to the WiFi network and the method ends;
    e) the user device obtaining a current value of verification parameters selected the first time the user device was connected to the network, comparing the current value of the verification parameters selected with a pre-established usual value of the verification parameters, determining whether the network verification is positive or negative based at least on said comparison and, only if the network verification is positive the user device sending a connection request to the access point.

2. The method according to claim 1 where in step c) the user device obtains the current value of some or all of the following parameters: position of the access point, set of neighbor networks detected, signal strength of neighbor networks detected, access point identifier and user devices connected to the WiFI network; and where the decision support information comprises one or more of the following: the obtained current value of the parameters, eventual similar networks on the basis of the obtained current value of the parameters together with the corresponding validation status of said similar networks, a list of allowed WiFi networks, a blacklist of WiFi networks, the corresponding value of the verification parameters in the networks of the blacklist.

3. The method according to claim 2 where in step c), if the user does not validate the network, the obtained current value of the parameters is stored in a database and/or the WiFi network is added to a blacklist.

4. The method according to claim 1, the method further comprises the following steps performed by the user device:
    f) if the user device sends a connection request to the access point;
    f1) receiving a message from the access point asking for a digest of the value of the verification parameters obtained by the user device,
    f2) sending the digest of the value of the verification parameters obtained by the user device and
    f3) receiving from the access point an IP address only after a WiFi network node, based on said digest, determines that the connection is allowed.

5. The method according to claim 1 where the pre-established usual value of the verification parameters is calculated based on the value of the verification parameters in all or some of the previous times the user device has been connected to said network.

6. The method according to claim 1 where, step d) further comprises: the user, through the user interface of the user device, selects thresholds to be used in the comparison of step e) for each verification parameter.

7. The method according to claim 1 where in step d), the WiFi network is added to a list of allowed WiFi networks.

8. The method according to claim 1 where the current value of the verification parameters obtained in step e) is stored in a common database.

9. The method according to claim 1 where the determination in step e) is also made based on the list of allowed WiFi networks and/or a blacklist of WiFi networks.

10. The method according to claim 1 where the identifier of the access point is the MAC address of the access point wireless interface or the Basic Service Set Identifier, BSSID, of the WiFi network to which the access point belongs to.

11. The method according to claim 1 where the user device is, a tablet, a mobile telephone, a smartphone, a laptop, a computer or a PC.

12. A user device for improving the security of a connection of the user device to WiFi networks, where the user device comprises:
- a receiver for receiving a beacon signal from an access point belonging to a WiFi network;
- a processor configured to:
- after receiving the beacon signal, if the user device has never been connected to said WiFi network: provide decision support information to the user through an user interface of the user device; and, after providing said decision support information, if the user device receives from the user through the user interface a validation of the WiFi network, send a connection request to the access point, provide to the user through the user interface the following list of parameters: GPS position of the user device, set of neighbor networks to the WiFi network detected by the user device, signal strength of neighbor networks, identifier of the access point and user devices connected to the WiFI network, and receive from the user through the user interface, a selection of some or all of them as verification parameters to be verified for future connection attempts to the WiFi network;
- after receiving the beacon signal, if the user device has ever been connected to said WiFi network: obtain a current value of verification parameters selected the first time the user device was connected to the network, compare the current value of the verification parameters selected with a pre-established usual value of the verification parameters, determine whether the network verification is positive or negative based at least on said comparison and, only if the network verification is positive the user device send a connection request to the access point.

13. A system for improving the security of a connection of a user device to WiFi networks, comprising the user device according to claim 12 and an access point belonging to a WiFi network, where the access point is configured to send a beacon signal to the user device.

14. The system according to claim 13 where the access point comprises:
- a receiver configured to receive a connection request from the user device,
- a processor configured to, if it is received a connection request from the user device, perform the following actions:
- send a message to the user device asking for a digest of the value of the verification parameters obtained by the user device,
- receive through the receiver the digest of the value of the verification parameters obtained by the user device;
- determine whether to assign an IP address to the user device or not, based at least on said digest;
- send the IP address to the user device if it is determined that an IP address is assigned to the user device.

15. A non-transitory digital storage medium for storing a computer program comprising computer executable instructions causing a computer executing the program to implement the method according to claim 1.

* * * * *

UNITED STATES PATENT AND TRADEMARK OFFICE
CERTIFICATE OF CORRECTION

| | |
|---|---|
| PATENT NO. | : 11,317,277 B2 |
| APPLICATION NO. | : 16/884149 |
| DATED | : April 26, 2022 |
| INVENTOR(S) | : José María Alonso Cebrian et al. |

It is certified that error appears in the above-identified patent and that said Letters Patent is hereby corrected as shown below:

On the Title Page

Item (30) Foreign Application Priority Data:
"19382429" should be changed to --19382429.9--

Signed and Sealed this
First Day of November, 2022

*Katherine Kelly Vidal*

Katherine Kelly Vidal
*Director of the United States Patent and Trademark Office*